F. H. HALL.
VEHICLE TOP.
APPLICATION FILED JAN. 10, 1921.

1,392,275.

Patented Sept. 27, 1921.

INVENTOR Frederick H. Hall
By
Attorney

UNITED STATES PATENT OFFICE.

FREDERICK HAROLD HALL, OF HOLFORD, NEAR BRIDGEWATER, ENGLAND.

VEHICLE-TOP.

1,392,275.  Specification of Letters Patent.  Patented Sept. 27, 1921.

Application filed January 10, 1921. Serial No. 436,272.

(GRANTED UNDER THE PROVISIONS OF THE ACT OF MARCH 3, 1921, 41 STAT. L., 1313.)

*To all whom it may concern:*

Be it known that I, FREDERICK HAROLD HALL, subject of the King of Great Britain, residing at Holford, near Bridgewater, England, have invented certain new and useful Improvements in Vehicle-Tops, (for which I filed application in England, July 18, 1919, Patent No. 151,407,) of which the following is a specification.

This invention relates to vehicle tops or hoods of the kind described in my United States Patent No. 1,345,174 dated the 29th June 1920, said vehicle tops being provided with depending side curtains adapted to be folded against and secured to the roof portion of the hood when not required for use.

The object of the present invention is to prevent the pulling-in or distortion of the vehicle top or hood where the side curtains are attached to the roof portion.

According to the present invention the side curtains are non-slidably attached at their upper edges to longitudinal flexible bands or straps arranged beneath the hood and connected to the hoop sticks.

Figure 1 of the accompanying drawings is a side elevation of a vehicle top or hood having side curtains attached at their upper edges in accordance with this invention.

The same reference numerals indicate corresponding parts in each of the figures.

Figure 1:
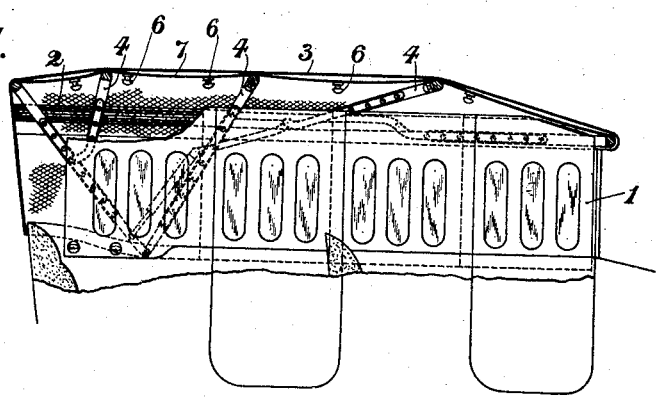
Figure 2:
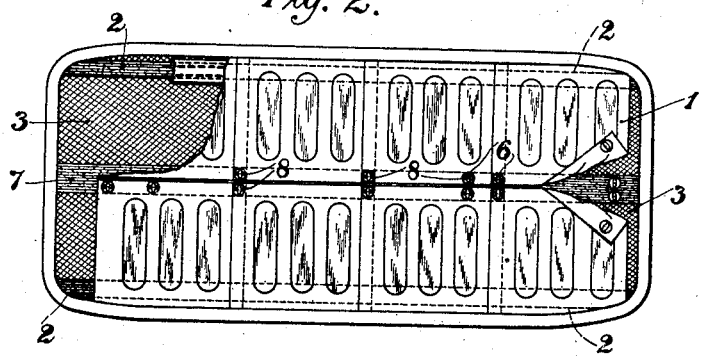
Fig. 2 is an underside plan of the vehicle top or hood, showing the side curtains folded against, and secured to, the underside of the roof of the hood.
Figure 3:
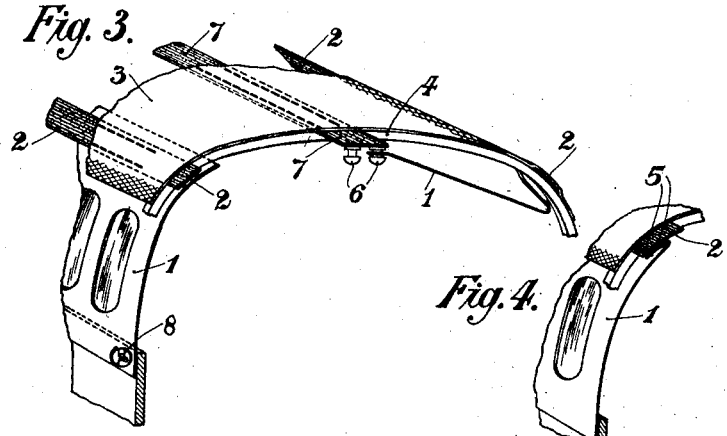
Fig. 3 shows a cross-sectional perspective view of the vehicle top or hood, the curtains at one side being folded against, and secured to, the roof portion.

In carrying out the invention, the side curtains 1 are attached at their upper edges, by any convenient means, to longitudinal bands or strips 2 arranged beneath the roof 3 and connected to the hoop sticks 4.

The said bands 2, which may be made of canvas, webbing, leather or the like, are arranged at opposite sides of the vehicle top or hood upon the underside thereof, and are secured by any suitable means to the hoop sticks 4 which they cross, thus running from one hoop stick to the next in the longitudinal direction of the vehicle.

The lower edges of the side curtains may be attached by turn-buttons, push-buttons or other means, to the body of the vehicle, while when the curtains are not required for use they may be folded against, and secured to, the roof of the hood, being held by turn-buttons 6 on a middle longitudinal flexible band 7 secured to the hoop-sticks 4, said turn-buttons engaging eyelets 8 in the lower edges of the curtains.

By attaching the upper edges of the side curtains as above described the material of the roof of the vehicle top or hood is relieved of all the weight of the said curtains.

It is to be understood that the bands 2 may be secured either to the top or to the underside of the hoop-sticks.

Also, each side band 2 may be either in one length, or divided into several lengths to facilitate attachment to the hoop-sticks.

The side curtains may be attached to the side bands 2 before the latter are secured to the hoop-sticks.

Figure 4:
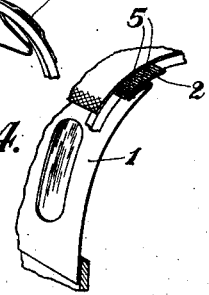
Fig. 4 illustrates a method of attaching the side curtains to the webs so as to prevent twisting of the latter.

In order to prevent twisting of the side bands 2, the curtains 1 are preferably attached thereto, as shown in Fig. 4, by two rows of stitches 5, 5, or suitable fastening means, one row near the outside edge of the band and the other row along the middle of the band, so that the pull of the curtains comes upon the longitudinal center line of the band.

When the curtains are turned up against the roof they can fold with the roof portion in a zig-zag manner.

Having fully described my invention, what I desire to claim and secure by Letters Patent is:—

A folding vehicle top comprising a collapsible roof covering, cross sticks carrying said covering, longitudinal flexible members beneath the opposite side portions of the roof covering and secured solely to the sticks, longitudinal central flexible means secured solely to the sticks below the roof covering, side curtains secured against movement at their upper edges to the flexible members beneath the opposite side portions of the covering, and means for detachably securing the lower portions of the curtains to the said central longitudinal flexible means to relieve the covering of the vehicle top of all weight of the curtains and permitting the curtains to fold and unfold with the said roof covering and the sticks.

In testimony whereof I have hereunto set my hand in presence of two subscribing witnesses.

F. H. HALL.

Witnesses:
W. S. SKERRETT,
H. O. PRATT.